Feb. 9, 1960  C. R. NICKOLS  2,924,335
WATER SOFTENER
Filed Jan. 27, 1954  3 Sheets-Sheet 1
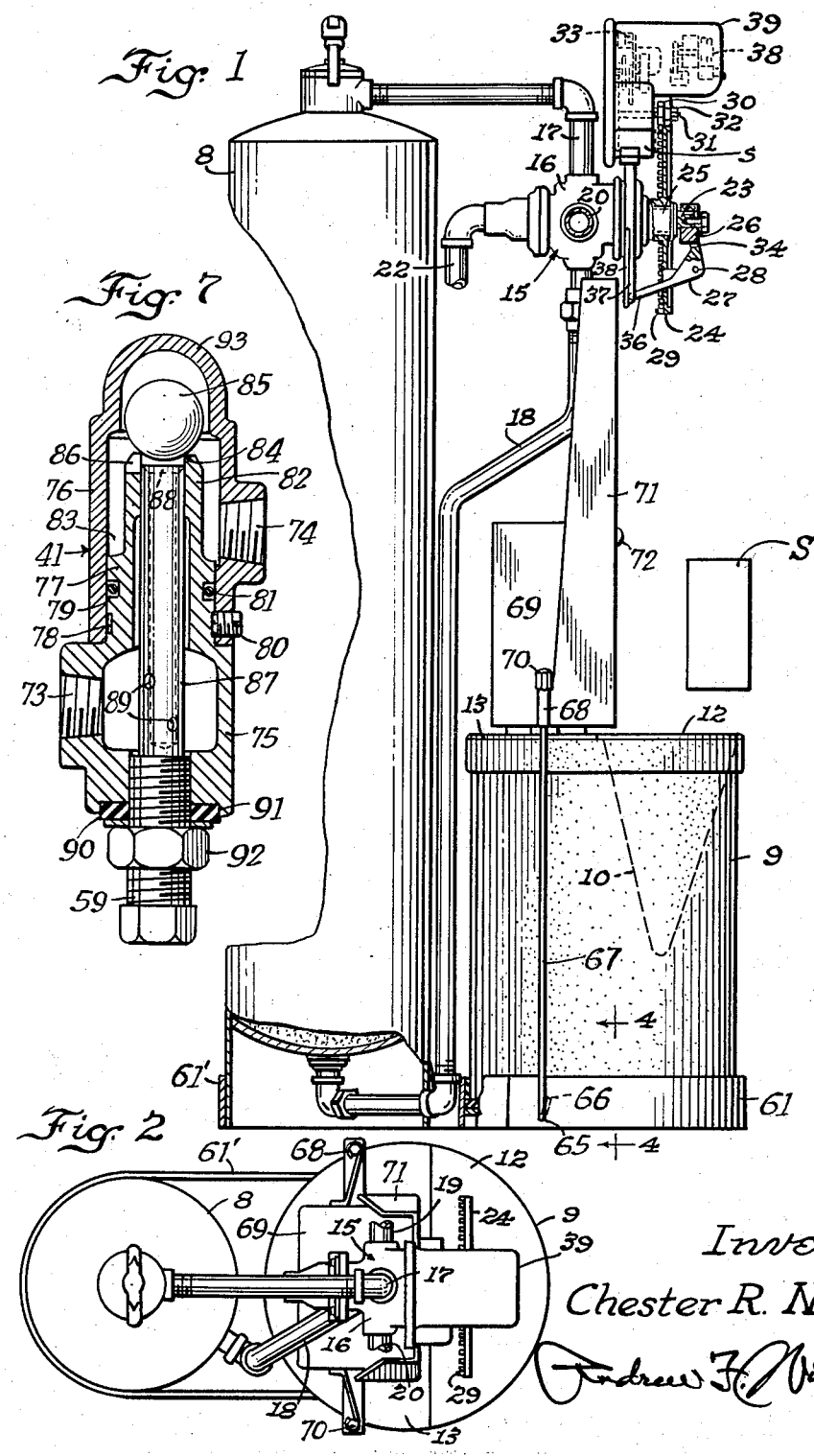
Inventor
Chester R. Nickols Feb. 9, 1960 — C. R. NICKOLS — 2,924,335
WATER SOFTENER
Filed Jan. 27, 1954 — 3 Sheets-Sheet 2
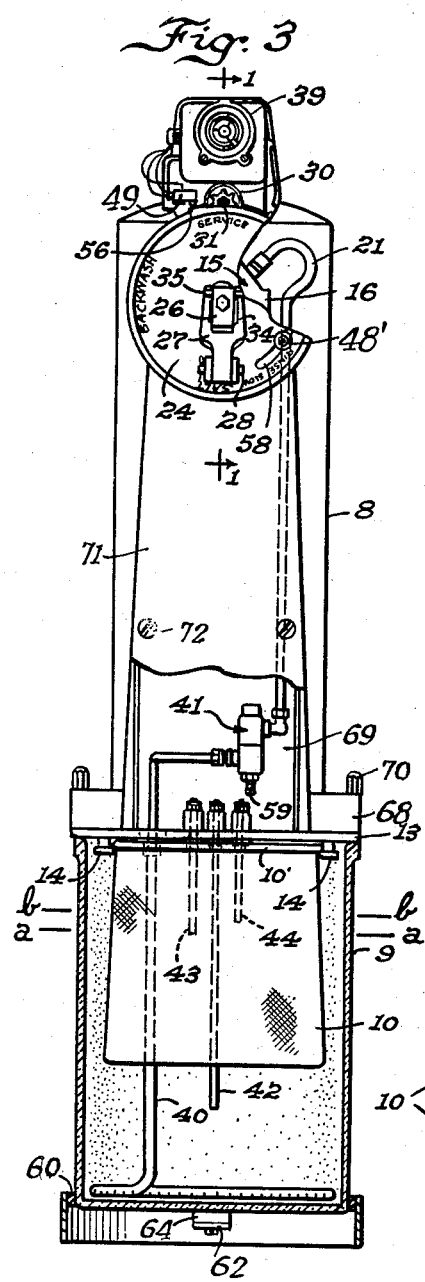
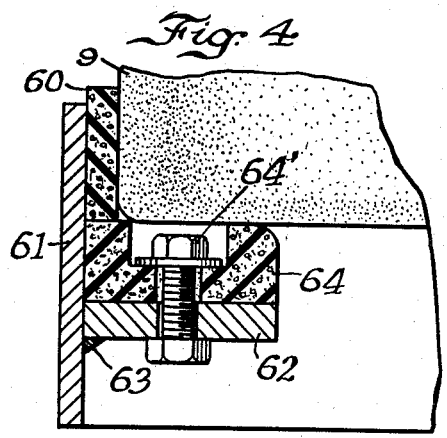
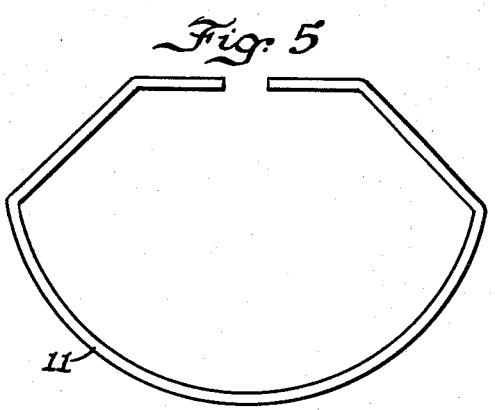
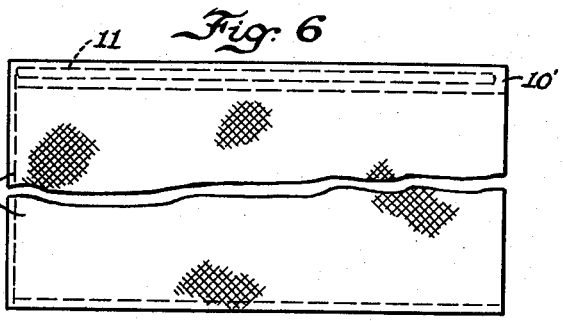
Inventor
Chester R. Nickols

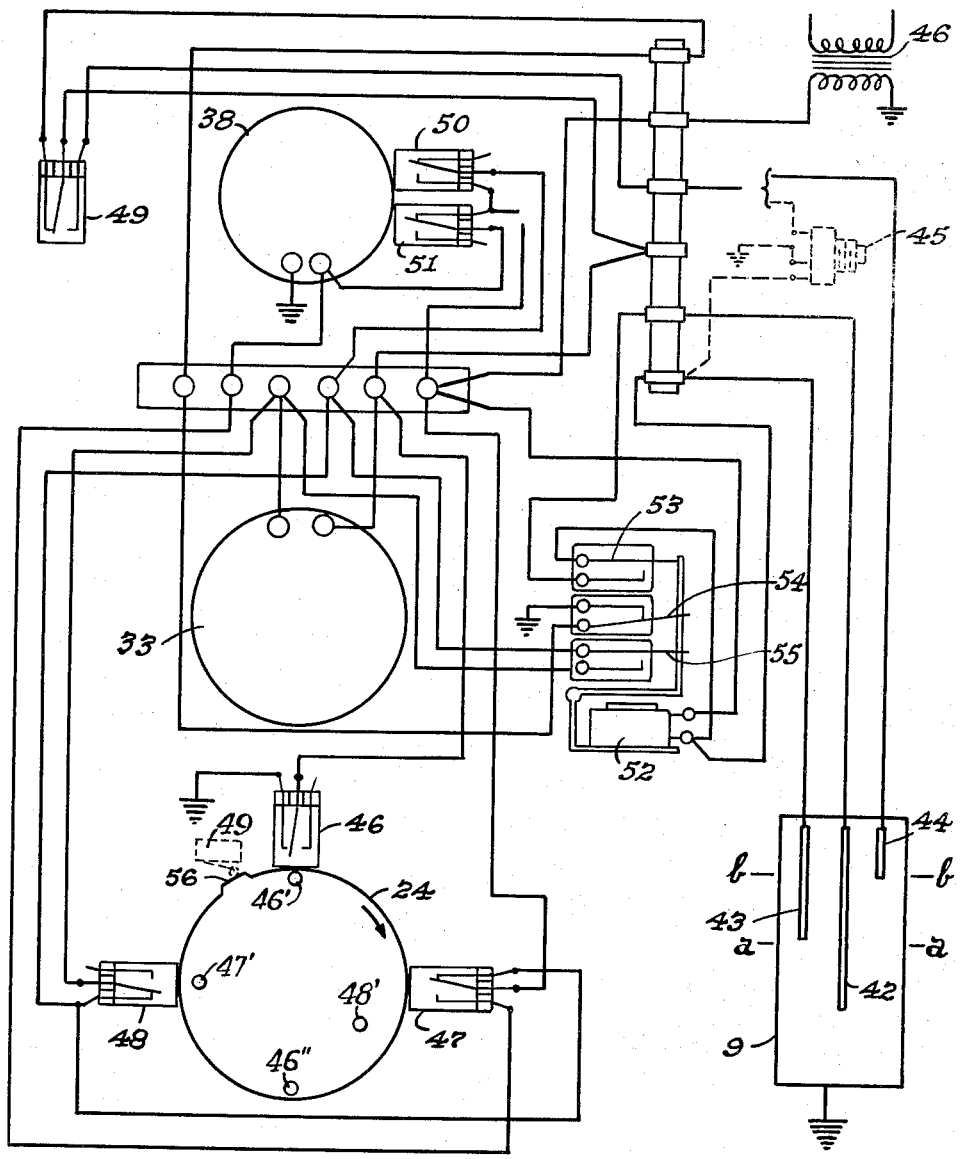

United States Patent Office 2,924,335
Patented Feb. 9, 1960

2,924,335

WATER SOFTENER

Chester R. Nickols, Sycamore, Ill., assignor to Elgin Softener Corporation, Elgin, Ill., a corporation of Illinois Application January 27, 1954, Serial No. 406,419

8 Claims. (Cl. 210—97)

This invention relates to base exchange water softeners and is more particularly concerned with improvements in automatic and semi-automatic softeners like that disclosed in my copending application, Serial No. 248,714, filed September 28, 1951, now Patent No. 2,799,294, issued July 16, 1957.

The principal object of my present invention is concerned with simplifying the construction and at the same time insuring better regeneration of the softener every time it is put through the regeneration cycle, this object being accomplished by eliminating the manual switch that was heretofore provided, the operation of which started the regeneration cycle, and providing in lieu of this starter switch an additional higher level electrode in the brine tank up to which the brine liquid level can be raised by adding a predetermined amount of salt to start the regeneration, thereby reducing the likelihood that a youngster or other unauthorized person tampering with the softener might throw it into regeneration, while at the same time also reducing the likelihood of the softener being thrown into regeneration when the brine available is not up to a specified concentration, due to an oversight on the part of the operator in regard to adding enough salt when needed. This improvement, while useful with any domestic softener, is especially good for a rental softener, because it compels the irresponsible rental customer to put in enough salt to keep the brine tank properly charged at all times, by requiring the addition of enough salt upon each regeneration in order to start the operation.

Another object of the invention is to provide an improvement in the brine tank whereby most of the impurities in the form of non-solubles in the salt, regardless of what commercial grade of salt happens to be used, that is, whether it be fine, medium or coarse, and either evaporated or rock salt, are segregated and may be conveniently removed instead of being allowed to collect in the brine tank, from which they ultimately find their way into the softener, the improvement consisting in the provision of a fabric bag suspended in the upper portion of the brine storage space into the open top of which the salt for the production of the brine is dumped, the bag being of such size in relation to the tank and so located in it that the charge of salt when supplied drops below the water level so as to displace water and thereby cause the rise in level necessary to contact the higher level starter electrode to start regeneration. The bag is preferably of nylon material of a sufficiently open weave to allow free passage of liquid therethrough and yet retain the non-solubles and other solid impurities, and it is suspended so that it may be conveniently removed for cleaning.

The invention is illustrated in the accompanying drawings, in which:

Fig. 1 is a side view of a complete water softener installation showing a portion of the construction in vertical section on the line 1—1 of Fig. 3;

Fig. 2 is a plan view of Fig. 1;

Fig. 3 is a front view of Fig. 1 showing the brine tank in vertical section and a portion of the vertical cover plate broken away to show the location of the rinse control valve and also disclose the insulated upper ends of the three electrodes in the brine tank;

Fig. 4 is a sectional detail on the line 4—4 of Fig. 1, showing the parts full size;

Fig. 5 is a plan view of a salt bag ring;

Fig. 6 is a side view of the salt bag with a portion thereof broken away to enable showing the bag on a larger scale and indicating the location of the ring in the hemmed top portion;

Fig. 7 is a section through the rinse control valve, and

Fig. 8 is a wiring diagram.

The same reference numerals are applied to corresponding parts throughout the views.

Referring to the drawings, the reference numeral 8 designates a water softener tank containing a bed of zeolite or other base exchange water softening material, and 9 is a brine tank of the present improved design and construction, using for its salt storage, and the filtering incidentally of impurities and non-solubles, a loosely woven nylon bag 10 that is suspended on a stainless steel ring 11 inserted in the hemmed upper portion 10′ of the bag, supporting the bag in the upper portion of the tank 9 under the removable front section 12 of the cover. The ring 11 is suitably detachably secured to the under side of the fixed rear section 13 of the cover of the brine tank by means of downwardly projecting studs 14 with a view to enabling easy removal of the bag 10 for emptying of whatever non-solubles and impurities may have collected therein and to permit cleaning of the bag. A multiple valve 15, which is along the lines of that disclosed in my copending application mentioned above and similar to that disclosed in the copending applications of Charles E. Russell and myself, Serial No. 35,404 and Serial No. 181,822, filed June 26, 1948 and August 28, 1950, respectively, which resulted in Patents 2,704,554 and 2,699,207 on March 22, 1955, and January 11, 1955, respectively, is provided for establishing different systems of fluid communication between the softener 8, brine tank 9, a source of raw water supply, a service system, and a drain, in the softening operation and the several steps of regeneration, namely, backwash, brining and rinsing.

Inasmuch as the valve 15 is fully disclosed in the other applications referred to, it should suffice for the present purpose to state that it consists of a body 16 provided with a plurality of threaded holes radially thereof for pipe connections, one of these being connected, as indicated at 17, with the top of the softener tank 8, while another is connected, as at 18, with the bottom of the softener tank. A pipe 19 extends laterally from one side of the body 16 to a source of raw water supply, and another pipe 20 extends laterally from the other side of the body to a service system. Still another pipe 21 extends laterally from the body 16 to the brine tank 8, and another pipe 22 is connected to the opposite end of the body 16 and extends to the drain. A valve plunger 23 is slidable and rotatable with a close working fit in the bore in body 16 to establish different flow circuits through the valve in the four different positions of rotation of the plunger, namely, service, backwash, bringing rinsing, determined by the different positions of rotation of the operating or program wheel 24. This wheel turns on a bearing 25 provided on the front end of the valve body 16, and the plunger 23 has its reduced front end portion extending through this bearing and has a block 26 secured thereto, whereby rotary and endwise movement is communicated to the valve plunger by means of a yoke or bell-crank lever 27 that is oscillatably mounted, as indicated at 28, on the wheel 24. The wheel 24 is in the form of a gear, but, instead of having ordinary gear teeth, has pegs or pins 29 projecting rearwardly therefrom in uniformly circumferentially spaced relation, between which the teeth of a drive pinion 30 are arranged to mesh to transmit drive to the wheel. The drive pinion has its hub arranged to be frictionally secured to the reduced threaded end of a shaft 31 by means of a nut 32. The drive motor 33 transmits drive to the shaft 31 through suitable reduction gears, and, when this motor runs, the wheel 24 is turned slowly, preferably so slowly that it takes about six minutes, for example, to make a complete revolution. By merely loosening the nut 32, wheel 24 is freed and, therefore, one may turn the wheel by hand if it is desired to check the operation of the softener, as, for example, at the time of installation. The bell-crank lever 27 has one end 34 forked and the fingers thereof operate between the projecting ends of two cross pins 35 that extend through holes in the block 26, whereby to provide a pivotal driving connection between the bell-crank 27 and the plunger 23. The other end 36 of the bell-crank 27 serves as a cam follower and operates in an annular cam track 37 provided in a fixed ring 38 that is secured to the front end portion of the body 16 of the valve 15. In the rotation of the wheel 24, therefore, the bell-crank 27 is moved relative to the cam track 37 and is oscillated accordingly as the end 36 moves radially with respect to the wheel 24 as it slides in the cam track 37. Provision is made, as disclosed in the first mentioned copending application, for adjustment of an arcuate cam forming a portion of the cam track 37 whereby to permit varying the backwash flow by merely adjusting a screw engaging the movable end of the arcuate cam, this arcuate cam being the portion of the track 37 engaged by the end 36 of the bell-crank 27 in the backwash position and the plunger 23 having a cylindrical plug end of such length and diameter and so arranged relative to the drain port communicating with pipe 22 that the rate of flow of water through the valve 15 is dependent upon the endwise adjustment of the plunger 23 relative to the bore in the body 16. In other words, the plunger 23 in the backwash position is shifted about 90° from the service position and is also shifted endwise to the extent determined by the adjustment of the arcuate cam, the compound movement being obtained by 90° rotation of the wheel 24 during which the bell-crank 27 not only turns the plunger 23 by means of its front end portion through the same angle but shifts the plunger endwise as a result of the oscillation of the bell-crank 27 by slidable engagement of its end portion 36 in the cam track 37. The plunger 23, incidentally, is spring-pressed inwardly relative to the body 16 and is movable outwardly by means of the bell-crank 27. Hence, the end 36 of the bell-crank 27 engages the cam track 37 under this same spring pressure. Analogous to the backwash adjustment just mentioned is another adjustment afforded by a rotatably adjustable eccentric at the diametrically opposite side of the cam track 37 from pinion 30 which eccentric is engaged by the end 36 of the bell-crank 27 when the wheel 24 reaches the service position indicated in Fig. 3, to insure tight seating of the drain valve at the inner end of the plunger 23 so that there will be no likelihood of leakage to the drain throughout the long service period. That adjustment is also fully disclosed in the copending application first mentioned.

The operation of the softener can now be traced generally as follows: In the "Service" position, the incoming raw water from pipe 19 is conducted from valve 15 through pipe 17 to the top of softener 8 for passage downwardly through the bed of zeolite for softening, and softened water leaving the bottom of the tank through pipe 18 is conducted back to the valve 15 and thence to the service system through pipe 20. At the end of the "Service" run, the plunger 23 in valve 15 is shifted to the "Backwash" position by simultaneous endwise and rotary movement through 90° clockwise rotation of wheel 24, the bell-crank 27 giving the compound movement to the plunger in the turning of the wheel 24, as previously described. In the "Backwash" position, the incoming raw water from pipe 19 is conducted from valve 15 to the bottom of the softener 8 through pipe 18 and flows upwardly through the bed of zeolite to break up the bed and wash out the sediment that accumulated on top of it in order to prepare the bed for the "Salt Draw," the waste water containing the sediment being conducted from the top of the softener 8 through pipe 17 back to the valve 15 and thence to the drain through pipe 22. The "Backwash" flow is accurately timed by a timer motor 38 that is housed with the drive motor 33 in a housing 39, and at the end of the Backwash the valve plunger 23 is turned another 90° to the Salt Draw or Brining position. In this position of the valve, the incoming raw water from pipe 19 is conducted through the plunger 23 directly to the drain 22, but, due to an ejector provided in the plunger 23 that is set into operation by the flow of the raw water through the plunger, there is entrained in the ejector with the water going to the drain water from the bottom of the softener tank 8 through pipe 18, and, inasmuch as the pipe 21 communicates with the bottom of the brine tank 9 through a slotted tube 40 by way of a control valve 41 and the pipe 21 communicates through valve 15 and pipe 17 with the top of the softener tank 8, brine is drawn from the brine tank 9 into the top of the softener tank in an amount equivalent to the amount of water withdrawn from the bottom of the softener tank. In that way, saturated brine is supplied for most efficient regeneration of the zeolite bed. When a predetermined amount of brine has been withdrawn from the brine tank 9, causing the brine level to drop below the electrode 42, the wheel 24 is turned through about 45° to the "Rinse" position. In the "Rinse" position, the incoming raw water from pipe 19 is conducted from the valve 15 to the top of the softener tank for passage downwardly therethrough to carry the brine through the bed and rinse out released calcium from the bed, the spent brine and waste water leaving the bottom of the softener tank being conducted through pipe 18 back to the valve 15 and thence to the drain 22. At the same time, a much smaller amount of water is bypassed from valve 15 through pipe 21 and control valve 41 to the brine tank 9 to refill it, the purpose in the restricted flow for refilling being to enable timing the Rinse by the length of time it takes to refill the brine tank up to the level of the electrode 43. When this electrode 43 is reached, wheel 24 is turned from the Rinse position through about 90° back to the "Service" position. During each of the steps of backwash, brining, and rinsing, raw water can be bypassed through valve 15 to the service system through pipe 20 so that the system is not completely shut off during regeneration.

Referring now to Fig. 8 for an understanding of the operation in so far as the electrical circuits are concerned, the motor 33 is arranged to be started by the operator pouring in enough salt into the bag 10 in the brine tank 9 to cause the brine level to rise from the line a—a at the bottom of electrode 43 to the line b—b where it contacts the bottom of a higher level starter electrode 44 provided in accordance with my present invention. This is preferably, though not necessarily, in lieu of having a push-button switch like that indicated in dotted lines at 45 which the operator would otherwise have to depress to throw the softener into regeneration, as disclosed in my copending application first mentioned. The electrode 44, if provided along with switch 45, would necessitate first adding the salt to make the switch 45 operative before regeneration could be commenced by closing the switch 45. The source of electrical power is 110 volt, 60 cycle, alternating current reduced to 24 volt current throughout the transformer 46. The power units are the drive motor 33 mentioned before and the timer motor 38. The controls are the starter electrode 44 just mentioned and the limit switches 46, 47, 48 and 49 operated by the wheel 24, plus limit switches 50 and 51 operated by the timer motor 38, plus relay 52 controlling switches 53, 54 and 55. When the starter electrode 44 is contacted by reason of the addition of a predetermined charge of salt, say, 10 lbs., dumped from a bag or carton of predetermined size supplied for the purpose like that indicated diagrammatically at S in Fig. 1, the motor 33 is caused to run so as to turn the wheel 24 from the "Service" position in a clockwise direction. The wheel starts, stops when it has turned through 90° to the "Backwash" position, and remains in that position for the duration of the Backwash. Switches 46–48 are carried in housing s (Fig. 1) differently spaced radially with respect to the center of wheel 24 and there are lugs 46', 46", 47' and 48' on the wheel in circumferentially spaced relation and at different radii associated with the correspondingly numbered switches and arranged to operate the same. A cam 56 provided on the periphery of the wheel 24 cooperates with an elevator type switch 49 to close the circuit to electrode 44 when the wheel 24 reaches the service position. When the operator later dumps in the salt and thereby raises the brine level in tank 9 to the starter electrode 44 the circuit is therefore closed for motor 33 (the same as if the push-button switch 45 in the old arrangement was depressed) and wheel 24 is accordingly turned in a clockwise direction. Cam 56 keeps the circuit closed long enough for the lug 46' to operate switch 46 to closed position, whereupon the cam 56 leaves switch 49 and it opens and stays open until the wheel 24 completes the revolution at the end of the cycle. Once the switch 46 is closed the motor 33 continues to operate until the next lug 47' on the wheel 24, 90° removed from lug 46' that operated switch 46, operates switch 47. The operation of switch 47 serves two functions: It opens the circuit for motor 33, causing it to stop with the wheel 24 in the "Backwash" position, and it simultaneously closes the circuit for timer motor 38, causing it to run. Now, the timer motor 38 operates two cams which are adjustably fixed on its output shaft at any selected angularity with respect to one another. The timer motor operates this shaft through reduction gearing so that it takes 30 minutes for the shaft to make a complete revolution. Consequently, the length of the Backwash may be anything up to 30 minutes depending upon the angular adjustment of the cams relative to one another. The cam which operated the switch 51 to an open position at the end of the previous run to stop motor 38 closes that switch when the switch 47 starts the motor 38 running, and the motor 38 then continues to run (namely, for 30 minutes) until the cam again operates switch 51 to the open position. According to the size of the included angle for which the second cam is adjusted relative to the first cam the Backwash time is determined, because when the second cam closes switch 50 the circuit for the power motor 33 is closed and the wheel 24 is turned from the Backwash position to the "Salt" or "Brining" position, where it stops by reason of a third lug 46" on the wheel 24 operating switch 46 to stop the motor 33. Switch 46, in other words, is arranged to be operated by either one of two lugs 46' and 46" disposed 180° apart on the wheel 24 and at the same radius. The lugs 47' and 48' for operating switches 47 and 48 are on other radii corresponding to the radii of those switches relative to wheel 24, one of these two other lugs 48' being mounted for adjustment in an arc relative to wheel 24 in the arcuate slot 58 provided in the wheel, the adjustment of this lug in a clockwise direction, as viewed in Fig. 3, causing the stoppage of the wheel 24 sooner and accordingly reducing the rinse flow rate, because of the fact that the ports in the plunger 23 are only in restricted communication with the ports in the body of the valve 15. If the lug 48' is adjusted in a counterclockwise direction, as viewed in Fig. 3, the wheel 24 will be stopped later and in a position in which the ports in the plunger 23 are more nearly in full register with the body ports allowing more water to flow through the softener in the rinse operation. In either event, the flow through the valve 15 for rinse purposes is much greater than that used for refilling the brine tank 9, because the flow for refill purposes must be restricted almost to a trickle in relation to the rinse flow in order to prolong the rinse to the extent required for good and adequate rinsing of the bed, such fine regulation of flow being made possible by the special construction of the valve 41, adjustable by means of the screw 59.

Continuing with Fig. 8, in the "Salt" or "Brining" position of the valve 15 brine is drawn from the tank 9 until the brine level drops to below the level of electrode 42. The brine, in other words, maintains a circuit through relay 52 throughout the Service operation and up to and including the Salt or Brining phase of regeneration. So long as the relay 52 remains energized the valve 15 remains in the Salt position but as soon as the brine level drops below electrode 42 relay 52 is de-energized and switch 54 is closed to start the power motor 33, so that wheel 24 will be turned from the Salt position to the "Rinse" position. The lug 43' on wheel 24 related to switch 48 opens that switch to stop the motor with the wheel 24 in the rinse position. The restricted communication between the ports in the plunger 23 and body of valve 15 afforded in that particular position of rotation of the plunger determines the rinse flow rate. The rinse flow is timed, as previously described, by timing the refilling of the brine tank 9. This timing involves the adjustment of the screw 59 so as to allow only a predetermined flow of water through valve 41 to the brine tank 9, so that it will take long enough to refill the brine tank to insure a good and adequate rinsing of the bed in the softener tank 8. It is important to note that with this arrangement changes in water pressure do not affect the rinsing operation appreciably because even if the water pressure drops from say 50 pounds down to say 25 pounds so that there is half as much water flowing through the bed that same pressure drop results in proportionately reducing the amount of water going to the brine tank 9 to refill it. Consequently, the softener is assured of a proper rinsing under all conditions. When the water level in the brine tank 9 rises to the level a—a, where it contacts electrode 43, the circuit through relay 52 is closed again, opening switch 54 and closing switches 53 and 55 so as to start the power motor 33 and turn the wheel 24 from the Rinse position back to the "Service" position, where the cam 56 closes switch 49 and lug 46' opens switch 46 to stop motor 33. Wheel 24 and valve 15 connected therewith then remain in the Service position until the next regeneration of the softener is commenced by the operator dumping in the predetermined charge S of salt.

The brine tank 9 is provided of ceramic material to eliminate the problem of corrosion and thus make for long life. However, the use of a ceramic tank introduces the problem of preventing fracture and breakage, especially in shipment. To reduce likelihood of breakage, therefore, I provide a ring of sponge rubber 60 surrounding the lower portion of the tank 9 and compressed between it and the sheet metal ring-shaped base 61. Three equally circumferentially spaced lugs 62 are welded or otherwise suitably secured, as indicated at 63, to the inner side of the ring 61 and these provide ledges on top of which blocks 64 of sponge rubber are fastened by means of bolts 64' to provide cushion supports for the brine tank. A U-shaped band 61' encloses the lower end of the softener tank 8 and has its end portions welded or otherwise suitably secured to the ring 61 so as to hold the brine tank 9 and softener tank 8 in a fixed spaced relationship. Holes 65 are provided in the ring 61 on opposite sides into which the hooked lower ends 66 of a pair of tie-rods 67 are engaged, and these tie-rods extend through bearings 68 provided on the lower portion of a junction box 69 that is secured to the top of the fixed cover portion 13, and nuts 70 are threaded on the threaded upper ends of the rods 67 and tightened to clamp the cover 13 onto the top of the tank 9 and hold the tank 9 in semi-rigid engagement with the cushion blocks 64. The junction box 69 affords a housing in which to mount the transformer 46 for handy connection with an extension cord (not shown) for connecting the softener with any convenient outlet, the low voltage side of the transformer having its leads extending upwardly from the junction box inside the front cover plate 71 to the switch housing s, and other leads extending downwardly from the switch housing s for connection with the upper ends of the electrodes 42—44, which project upwardly inside the junction box 69, as clearly appears in Fig. 3. The cover plate 71 is suitably secured to the open front of housing 69 by screws 72. The cover plate 71 also serves to enclose the pipe 21 and to conceal the rinse control valve 41 disposed inside the box 69.

The rinse control valve 41 allows unrestricted flow of brine upwardly therethrough, namely, from the pipe connection at 73 to the pipe connection at 74, but only a very restricted flow in the opposite direction, namely, in the refilling of the brine tank 9. The valve comprises a main body part 75 on which another body part 76 is swivelled to permit making the pipe connections at 73 and 74 in whatever angular relationship is desired. The tubular extension 77 of body part 75 has annular grooves 78 and 79 provided therein, and a set-screw 80 threaded in the body part 76 engages in groove 78 to fasten the body parts in any desired adjusted relationship, while a compressible resilient O-ring 81 is seated in groove 79 and compressed by engagement with the walls of body part 76 to prevent leakage. The upper end portion 82 of the tubular portion 77 is reduced, whereby to provide a sediment collecting chamber 83 in the body part 76 below the upper end of the reduced portion 82, where a valve seat 84 is provided for engagement by the ball check valve 85. A narrow elongated metering slot or port 86 is provided in the upper end of the reduced portion 82, and a metering valve or quill 87 working inside the tubular portion 77 is provided as an integral part of the adjusting screw 59 for adjustment lengthwise of port 86 for fine adjustment of the refill flow. The upper end of the bore of the quill 87 is chamfered, as indicated at 88, to provide operating clearance for the ball 85 in the event of too close adjustment. Ports 89 in the lower portion of the quill allow unrestricted flow of brine through the quill in one direction and refill water in the other direction. A compressible resilient gasket 90 seats in a recess 91 in the lower portion of the body part 75 and is compressed by the tightening of a lock-nut 92 to hold the quill 87 in adjusted position and at the same time prevent leakage from the valve 41. The hollow half-round reduced upper end portion 93 of the body part 76 serves as a cage or retainer for the ball 85 allowing the ball to move far enough off the seat 84 during brine flow so that there is no restriction to such flow.

It is believed the foregoing description conveys a good understanding of the objects and advantages of my invention. The appended claims have been drawn to cover all legitimate modifications and adaptations.

I claim:

1. In combination, a water conditioner tank containing a bed of water conditioning material, a brine tank, a valve mechanism and pipes for connecting the same with the two tanks and with a source of raw water supply under pressure, a service system, and a drain, said valve mechanism adapted to establish different flow circuits including said first tank in different positions of the valve mechanism, and electrical motor operated means for automatically shifting the valve mechanism through a sequence of positions of service, backwash, salt draw, and rinse, the improvement which consists in providing in the brine tank a pipe for brine outflow and water inflow extending from the valve mechanism, water level control means comprising a high level electrode and a low level electrode in said brine tank electrically connected with the electrical motor operated means to cause operation thereof to shift the valve mechanism from salt drawing to rinse position when the brine level drops to beyond the lower end of the low level electrode and to cause another operation of said electrical motor operated means to shift the valve mechanism from rinse to service position when the water refilling the brine tank reaches the high level electrode, said brine outflow and water inflow pipe including a check valve that opens to allow unrestricted outflow of brine and closes to allow only a restricted inflow of water, and a starter electrode at a level a predetermined distance above the aforesaid high level electrode up to which the brine level can be raised by the addition of a predetermined amount of salt, said starter electrode being also electrically connected with said electrical motor operated means to cause the operation thereof to shift the valve mechanism from service position to backwash position and start the regeneration cycle when the brine level is raised to contact the starter electrode.

2. In combination, a water conditioner tank containing a bed of water conditioning material, a brine tank, a valve mechanism and pipes for connecting the same with the two tanks and with a source of raw water supply under pressure, a service system, and a drain, said valve mechanism adapted to establish different flow circuits including said first tank in different positions of the valve mechanism, and electrical motor operated means for automatically shifting the valve mechanism through a sequence of positions of service, backwash, salt draw, and rinse, the improvement which consists in providing in the brine tank a pipe for brine outflow and water inflow extending from the valve mechanism, water level control means comprising a high level electrode and a low level electrode in said brine tank electrically connected with the electrical motor operated means to cause operation thereof to shift the valve mechanism from salt draw to rinse position when the brine level drops to beyond the lower end of the low level electrode and to cause another operation of said electrical motor operated means to shift the valve mechanism from rinse to service position when the water refilling the brine tank reaches the high level electrode, said brine outflow and water inflow pipe including a check valve that opens to allow unrestricted outflow of brine and closes to allow only a restricted inflow of water, said check valve including a manually adjustable bleeder valve, and a starter electrode at a level a predetermined distance above the aforesaid high level electrode up to which the brine level can be raised by the addition of a predetermined amount of salt, said starter electrode being also electrically connected with said electrical motor operated means to cause the operation thereof to shift the valve mechanism from service position to backwash position and start the regeneration cycle when the brine level is raised to contact the starter electrode.

3. In combination, a water conditioner tank containing a bed of water conditioning material, a brine tank, a valve mechanism shiftable rotatively through a series of predetermined positions for a cycle of regeneration, pipes connecting said valve mechanism with the two tanks and with a source of raw water supply under pressure and also a service system and a drain, said valve mechanism being adapted to establish different flow circuits including said first-mentioned tank in different positions of the valve mechanism, an electric drive motor operatively connected with the valve mechanism, an electric timer motor which is operated a certain length of time each time it is started in a cycle of regeneration and operates manually adjustable means for operating switch means electrically connected with the drive motor, whereby by the closing of the switch means to start the drive motor after the timer motor has operated a predetermined time to time the staying of the valve mechanism in a given position, such as backwash, a program wheel connected to turn with the valve mechanism, switches electrically connected with the timer motor operated switches and the drive motor and operated by projections on said wheel for stopping the drive motor and accordingly predetermining stopping points in the turning of the valve mechanism through a cycle, and means responsive to changes in level of liquid in said tank and electrically connected with the drive motor and aforesaid switches, whereby to start the drive motor when the brine level in the brine tank during the salt draw drops to a predetermined point, the program wheel thereafter operating one of the correlated switches to stop the drive motor with the valve mechanism in rinse position, said level responsive means thereafter starting the drive motor again in response to rise in liquid level in said brine tank due to refilling, and the program wheel thereafter operating another one of the correlated switches to stop the drive motor with the valve mechanism in starting position, said level responsive means including a top level electrode in the brine tank above the level of the liquid in the brine tank and so spaced from the liquid that the addition of a predetermined amount of salt in said brine tank causes the liquid level therein to rise and contact said electrode to complete a circuit through the drive motor to commence the movements of the valve mechanism for a regeneration cycle, consisting of backwash, salt draw, and rinse, the program wheel upon arrival of the valve mechanism in backwash position operating others of its correlated switches to stop the drive motor and start the timer motor.

4. In an automatic water softener control mechanism, a valve mechanism connected with a softener and a brine tank and connected with a source of raw water under pressure and also a service system and a drain, a motor operatively connected with the valve mechanism for shifting the same from a service position through a series of positions including backwash, salt draw, and rinse, and back to service, means electrically connected with said motor and responsive to liquid level changes in the brine tank for starting the motor when the brine level reaches a predetermined low point to shift the valve mechanism from salt draw to rinse position, said means thereafter starting the motor again when the liquid level in the refilling of the brine tank reaches a predetermined high point whereby to shift the valve mechanism from rinse to service position, said valve mechanism being so constructed and connected as to bypass water to the brine tank for refilling during rinsing of the softener, a manually adjustable valve in said bypass for varying this refill flow so as to take long enough for an ample rinse, and another means electrically connected with said motor and responsive to a predetermined liquid level change in said brine tank above the aforesaid high point for closing the circuit for said motor to shift the valve mechanism from service position to backwash position, said last named means being operable by adding a predetermined amount of salt to the brine tank at whatever time is selected for the regeneration to raise the level the predetermined required extent, the predetermined amount of salt required to be added to start regeneration being at least equivalent to the salt required to produce the volume of concentrated brine used in each regeneration.

5. In an automatic water softener control mechanism, a valve mechanism connected with a softener tank and a brine tank and connected with a source of raw water under pressure and also a service system and a drain, a motor operatively connected with the valve mechanism for shifting the same from a service position through a series of positions including backwash, salt draw, and rinse, and back to service, and means electrically connected with the motor and responsive to a predetermined liquid level change in the brine tank above that maintained normally during the service run of the softener for closing the circuit for said motor to shift the valve mechanism from service position to backwash position, said last named means being operable by adding a predetermined amount of salt to the brine tank at whatever time is selected for the regeneration to raise the level the predetermined required extent, the predetermined amount of salt required to be added to start regeneration being at least equivalent to the salt required to produce the volume of concentrated brine used in each regeneration.

6. In combination, in a water conditioning apparatus, a tank containing a bed of water conditioning material, a brine tank, valve mechanism connected with said tanks and with a source of raw water supply under pressure and also a service system and a drain, said valve mechanism being adapted to establish different flow circuits through said first tank in different positions of the valve mechanism, an electric motor operatively connected with the valve mechanism to shift the same from one to another of a series of positions including service, backwash, salt draw, and rinse, said valve mechanism including a bypass to the brine tank for refilling the same during rinse, a manually adjustable valve in said bypass for varying refill flow to accordingly shorten or lengthen the rinse period, and means responsive to liquid level changes in the brine tank including two vertically spaced electrodes electrically connected with said motor, the low electrode being spaced relative to the high electrode to predetermine the amount of brine used in regeneration by causing the motor to shift the valve mechanism from salt draw position to rinse position when the liquid level in the brine tank drops from the level of the high electrode below the level of the low electrode, the rinse period being then timed according to the time required in refilling the brine tank for the liquid level to reach the high electrode in rising from the low electrode.

7. The combination set forth in claim 6 wherein the means responsive to changes in liquid level in the brine tank includes a starting electrode in said brine tank also electrically connected with said motor for operating the valve mechanism, said starting electrode eliminating the necessity for a manual start switch for starting the motor at the commencement of a regeneration cycle and being spaced above the high electrode a short distance in relation to the spacing of the low and high electrodes, so that it requires the addition of a predetermined amount of salt in the brine tank to cause the liquid level therein to rise enough to contact said starting electrode and thereby complete the circuit through the motor for starting the regeneration cycle.

8. In combination, a water conditioner tank containing a bed of water conditioning material, a brine tank, a valve mechanism and pipes connecting the same with the two tanks and with a source of raw water supply under pressure and also a service system and a drain, said valve mechanism establishing different flow circuits including said first tank and said source of raw water supply, service system, and drain in different positions of the valve mechanism, and electrical motor operated means operatively connected with said valve mechanism for automatically shifting the same through a sequence of positions of service, backwash, salt draw, and rinse, the improvement which consists in providing in the brine tank a pipe for brine outflow and water inflow extending from the valve mechanism and thereby connected with the other pipes for communication with the source of raw water supply and the first mentioned tank and the drain, water level control means comprising a high level electrode and a low level electrode in said brine tank electrically connected with the electrical motor operated means to cause operation thereof to shift the valve mechanism from salt drawing to rinse position when the brine level drops to beyond the lower end of the low level electrode and to cause another operation of said electrical motor operated means to shift the valve mechanism from rinse to service position when the water refilling the brine tank reaches the high level electrode, and a starter electrode at a level a predetermined distance above the aforesaid high level electrode up to which the brine level can be raised by the addition of a predetermined amount of salt, said starter electrode being also electrically connected with said electrical motor operated means to cause the operation thereof to shift the valve mechanism from service position to backwash position and start the regeneration cycle when the brine level is raised to contact the starter electrode as by adding a predetermined amount of salt in the brine tank.

References Cited in the file of this patent

UNITED STATES PATENTS

| | | |
|---|---|---|
| 409,234 | Quinn | Aug. 20, 1889 |
| 573,342 | Miller | Dec. 15, 1896 |
| 1,346,898 | Kingsbury | July 20, 1920 |
| 1,354,604 | Duggan | Oct. 5, 1920 |
| 1,654,537 | Dotterweich | Jan. 3, 1928 |
| 1,683,362 | Loffler | Sept. 4, 1928 |
| 1,721,105 | Dotterweich | July 16, 1929 |
| 1,736,890 | Sweeney | Nov. 29, 1929 |
| 1,788,358 | Goerg | Jan. 6, 1931 |
| 1,933,370 | Dotterweich | Oct. 31, 1933 |
| 1,937,325 | Pick | Nov. 28, 1933 |
| 1,940,965 | Nash | Dec. 26, 1933 |
| 2,077,003 | Nash | Apr. 13, 1937 |
| 2,086,607 | Culligan | July 13, 1937 |
| 2,120,429 | Nash | June 14, 1938 |
| 2,209,487 | Wagner | July 30, 1940 |
| 2,270,372 | Hunter | Jan. 20, 1942 |
| 2,465,816 | Pelletier | Mar. 29, 1949 |
| 2,538,418 | Hughes | Jan. 16, 1951 |
| 2,620,089 | Van Loghem | Dec. 2, 1952 |